E. NALL.
CORE COOLING APPARATUS.
APPLICATION FILED SEPT. 27, 1916.
1,251,088.
Patented Dec. 25, 1917.
4 SHEETS—SHEET 1.
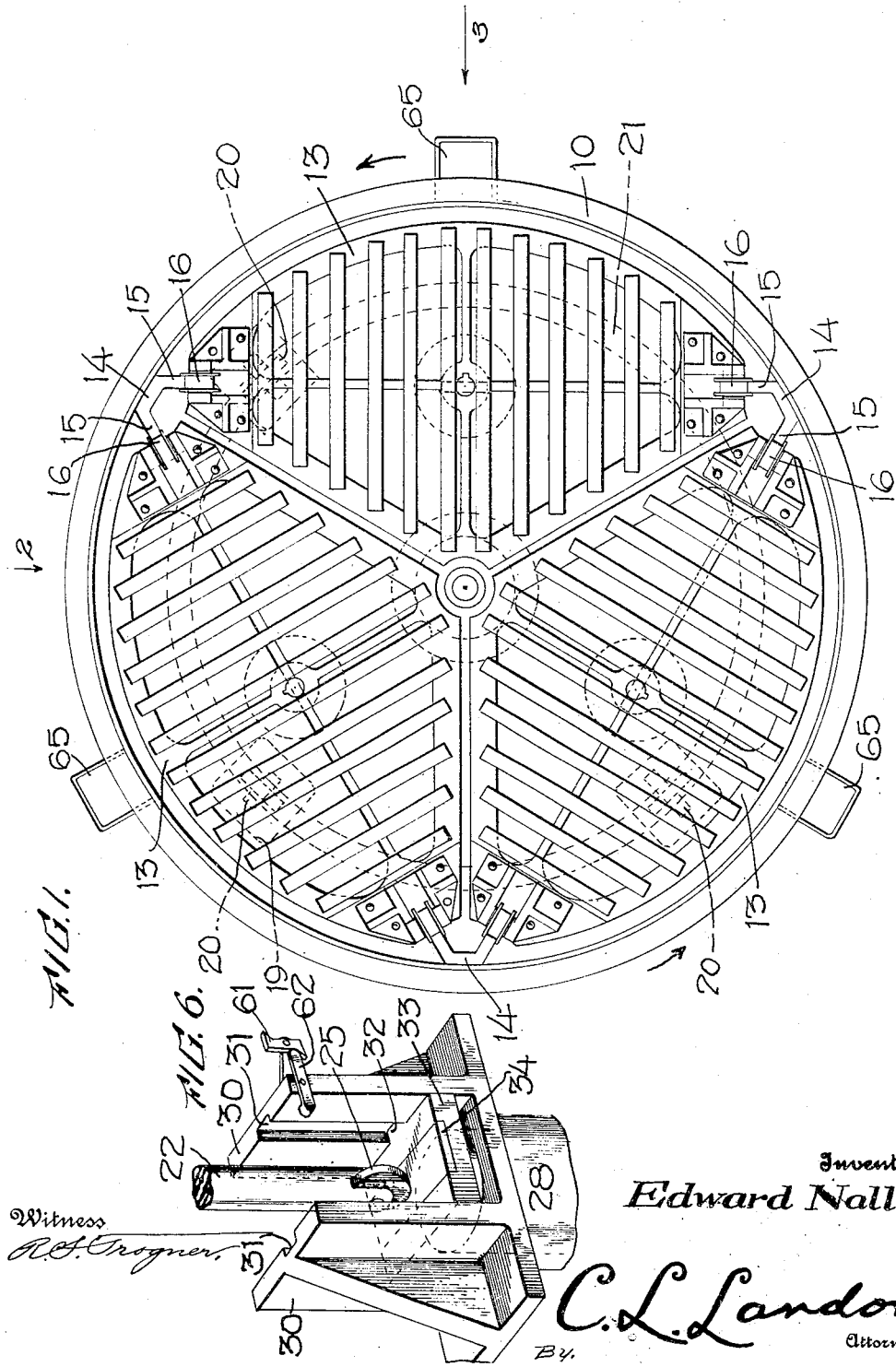
Inventor
Edward Nall.
Witness
R. S. Trogner
By C. L. Landon
Attorney E. NALL.
CORE COOLING APPARATUS.
APPLICATION FILED SEPT. 27, 1916.
1,251,088.
Patented Dec. 25, 1917.
4 SHEETS—SHEET 2.
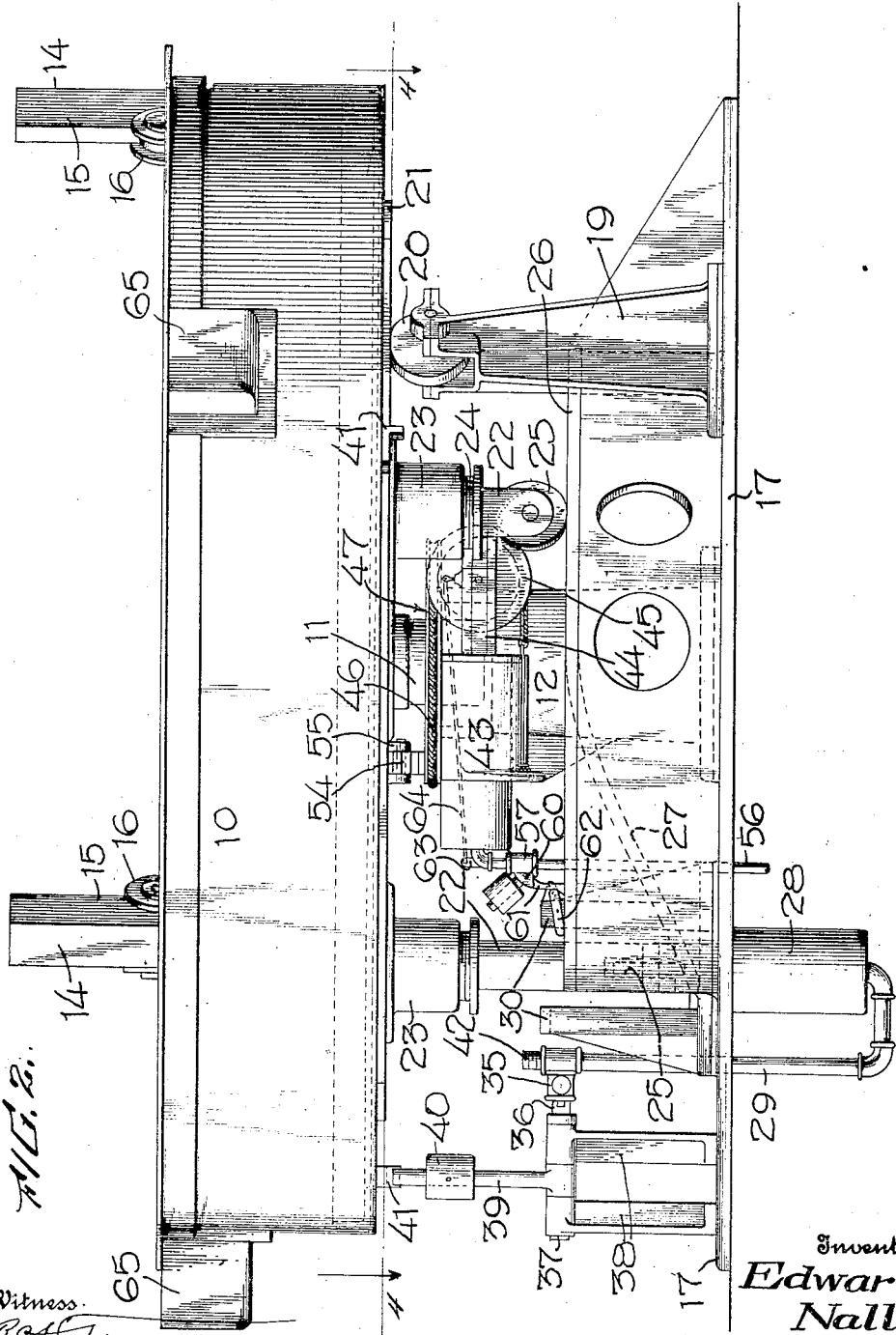
Inventor
Edward Nall.
By C. L. Landon
Attorney
Witness
R. F. Trogner

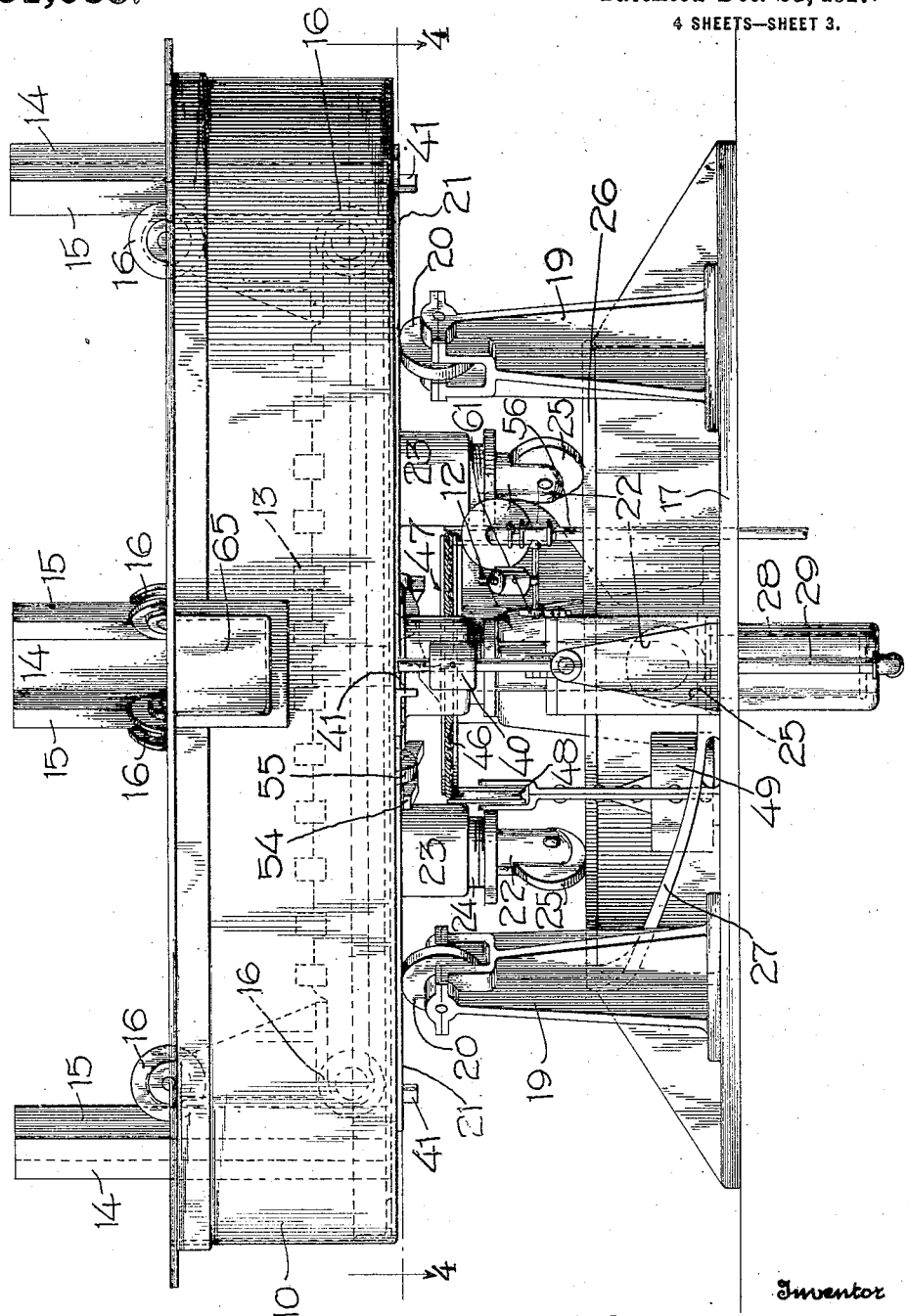

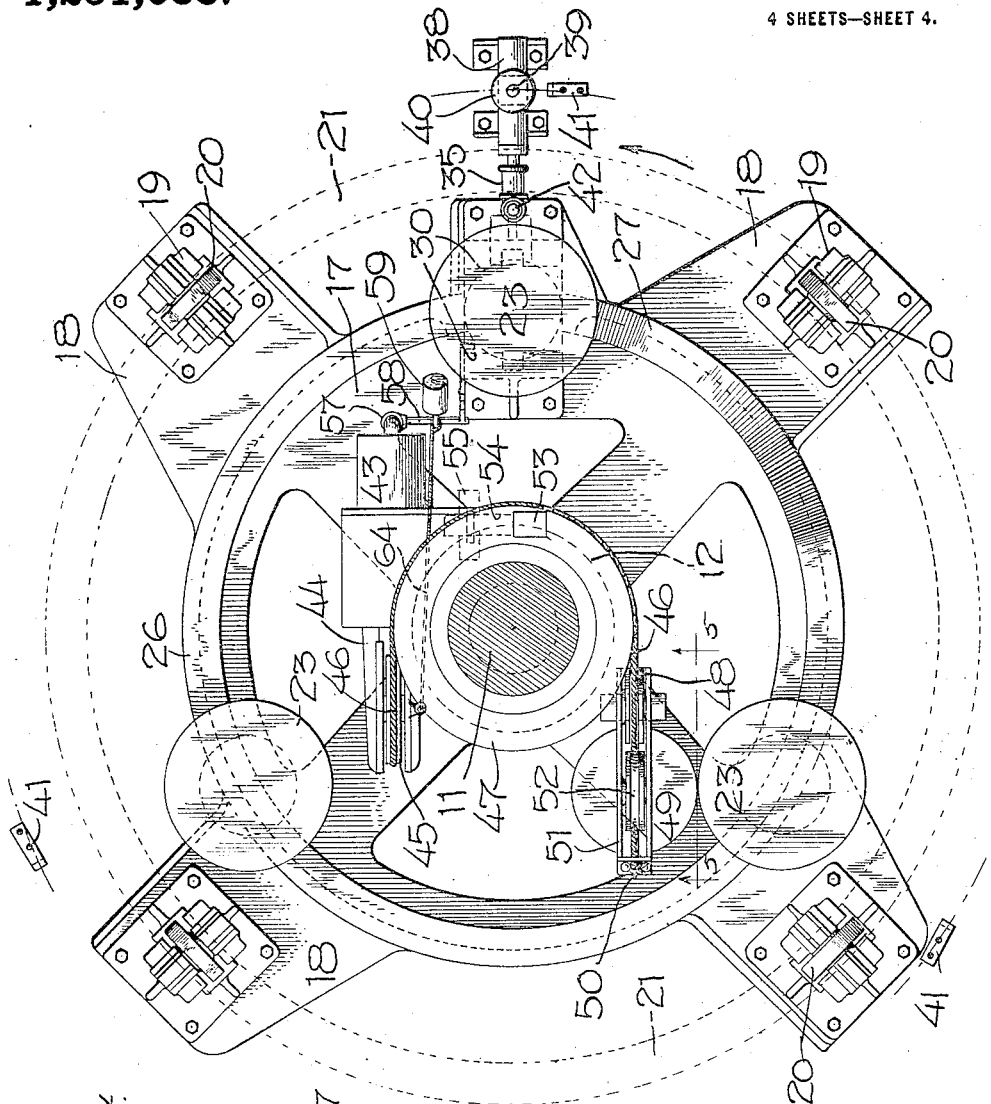

UNITED STATES PATENT OFFICE.

EDWARD NALL, OF AKRON, OHIO, ASSIGNOR TO THE GOODYEAR TIRE & RUBBER COMPANY, OF AKRON, OHIO, A CORPORATION OF OHIO.

CORE-COOLING APPARATUS.

1,251,088.   Specification of Letters Patent.   Patented Dec. 25, 1917.

Application filed September 27, 1916. Serial No. 122,416.

*To all whom it may concern:*

Be it known that I, EDWARD NALL, a citizen of the United States, residing at Akron, in the county of Summit and State of Ohio, have invented new and useful Improvements in Core-Cooling Apparatus, of which the following is a specification.

My present invention relates to a machine for cooling hot metals, and in particular, relates to a machine equipped with a number of support platforms vertically movable through a cooling bath, in such a manner that the hot metal laid upon any platform will be automatically subjected to a bath in the cooling fluid and subsequently ejected from the bath in position for removal from the apparatus.

This invention was designed, primarily, for use in connection with the cooling of cores upon which vehicle tires have been vulcanized, yet it will become apparent that the invention is of such generic utility as to warrant its employment for cooling metals of any nature.

In the industry concerned with the manufacture of vehicle tires, one of the customary methods of curing the tire is to subject it to vulcanizing heats upon the ring core on which the tire carcass has been built up. Upon removal from the vulcanizers the tires are stripped from the cores and the latter, owing to their ability to retain heat, must be cooled prior to the handling necessary to relay them back to serve as formers for a subsequent set of tire carcasses. It is the almost universal practice, in factories which are confronted by the necessity for cooling the tire cores, to slide the core, after the tire has been removed therefrom, into a large tub of water. The removal of the heavy cores from the cooling tub, however, is a difficult labor, attended by a disproportionate time loss, since the core-men must grope over the bottom of the tub for each core, and are frequently required to use a chain and grapple to effect removal of the lowermost cores. Not only does the method now in use require the services of a number of laborers to empty the tub of its cores, but the work of the tire strippers is also interrupted while the tank is being emptied.

Being cognizant of the disadvantages attendant upon the present practice, as above outlined, it has been my broad object, in the present invention, to provide means for automatically bathing each core separately and subsequently bringing it to the surface of the cooling fluid for ready removal by a single laborer.

In a more specific rehearsal, I propose the provision of a revoluble cooling tub in which a number of platforms are independently movable in a vertical fashion, and the provision of means whereby the platforms are successively carried along, as the tub rotates, at a loading height above the water, dipped into the cooling fluid and subsequently returned above the surface of the fluid in order that the cooled core may be removed and the successive platforms thus prepared for a new load.

It is a further object of the invention to provide means securing an intermittent rotation of the cooling tank to be controlled by the operators thereof in order that a sufficient time for the loading and removing periods may be obtained, and to this end, I provide a step-by-step mechanism for rotating the tank through a partial revolution, together with means for returning the mechanism to its first position of operation, while the tank is at rest, in order to be in readiness to impart the next partial revolution thereto.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a plan view of the metal cooling apparatus comprehended by this invention;

Fig. 2 is an elevational view looking in the direction of the arrow of Fig. 1;

Fig. 3 is an elevational view at right angles to that of Fig. 2, looking in the direction of the arrow 3 in Fig. 1;

Fig. 4 is a view of the tank base and its operating mechanism, taken on the plane indicated by the lines 4—4 of Fig. 3;

Fig. 5 is a detail view of the means for returning the step-by-step mechanism after the completion of the partial revolution of the cooling tank; and Fig. 6 is a detailed perspective of the means employed to raise the platforms successively to the surface of the cooling fluid, for the removal of the cooled material therefrom.

In the preferred form of the invention, which I herein disclose, the cooling tank, or tub 10, is provided with a central stem 11 mounting the tank for revolution upon a bearing pedestal 12. The tank is preferably cylindrical in form and has arranged therewithin a number of segmental platforms 13 of the gridiron construction clearly illustrated in Fig. 1. Guide standards 14 are erected within the tank, between the adjacent platforms of each pair and present track webs 15 to guide the platform or grids 13 in their vertical reciprocation. At each extremity of all the grids 13, there is mounted a pair of guide wheels 16, engaged in vertical alinement with the appropriate track 15 of the adjacent guide posts. In this manner each of the grids is permitted independent vertical movement within the tank, as the latter rotates upon its pedestal.

A base plate 17 is provided for the apparatus, and from this base plate there extends in a cruciform arrangement, a number of base flanges 18 upon which are erected the stirrup pedestals 19 supporting at their upper extremities rollers 20, which serve as additional supports for the revoluble tank 10 and to insure uniform rotation of the tank about its central pedestal. Preferably a circular track-way 21 of some hardened material is provided upon the base of the tank to prevent undue wear by the rollers 20.

Each of the grids 13 is centrally supported by a pedestal arm 22 operable within a sleeve 23 dependent from the tank, and provided with leak-preventing packing noted by the numeral 24. Each of the grid pedestals 22 terminates in a bifurcation which mounts a roller 25 and these rollers are adapted to travel upon a cam trackway 26 which is supported by the base 17 of the apparatus. For approximately three-fourths of its length the trackway 26 is a simple circle, which is terminated, however by a descending helical arc. This arc terminates upon the base 17 at a distance below the beginning of the circular trackway portion which is equal to the entire throw, or vertical movement, of the grids 13. Since I found by experimentation that the use of an ascending trackway portion, to connect the terminus of the descending helix 27 with the beginning of the horizontal track, rendered the rise of the platforms to the surface of the liquid within the tank entirely too gradual, I have had recourse to the means illustrated in Figs. 2, 3 and 6 to vertically lift the platforms through this distance.

This apparatus includes a jack 28, consisting of a cylinder in which a piston is operable by any desirable fluid means, such as air pressure, which may be admitted through the feed pipe 29. Over the mouth of the cylinder, which is sunk below the level of the base 17, is arranged a casting having upright guide plates 30, which are grooved as indicated at 31 to accommodate lugs 32 formed upon the piston head 33. The latter is thus arranged for a guided vertical movement in response to admission of the fluid of pressure into the cylinder of the jack. In its lowermost portion, the cylinder head 33, is in horizontal alinement with the terminus of the cam trackway 27, and is preferably provided with a wear plate 34 to receive the rollers 25 of successive platform pedestals 22. The intermittently revoluble tank 10 comes to rest with one of the platform pedestals in position upon the piston head 33, and an admission of the pressure fluid into the jack cylinder 28 at this time will raise the platform pedestal from the cam terminus to the beginning of the horizontal circular trackway, while, at the same time, re-starting the tank upon its intermittent rotation, as will be later set forth.

The inlet feed pipe 29, through which the pressure fluid is admitted into the lifting jack, is provided with a valve chamber 35 in which is operable a cylindrical oscillating valve 36 which is carried upon a shaft 37 supported above the base plate 17 by means of the fixed bearing members 38. Secured upon a shaft 37 intermediate the bearing members 38 is an operating arm 39, whereby the workmen may control the admission of air into the lifting jack. This arm carries a weight 40 and projects upwardly into the path of lugs 41, which are arranged upon the bottom of the tank 10 slightly behind the center of each platform 13, as regards the direction of rotation. The valve 36 is provided with a single opening which is adapted to register with the bore of the feed pipe 29 only when the operating arm 39 has been deflected toward the left in Fig. 3. The lugs 41 serve to support the said valve arm until the jack 28 is operated to lift the platform pedestal upon a level with the trackway 26, and serves upon a resumption of intermittent rotation by the tank 10 to close the valve by throwing it off center toward the right of Fig. 3. It is, of course, to be understood that the fluid of pressure may be conducted to the feed pipe 29 from any suitable source connecting to the valve chamber 35 at the inlet terminus 42.

Raising the rolling pedestal of the platform which has just completed its movement along the cam trackway 27 also serves to initiate movement of the tank 10, in the manner to be now described. An operating cylinder 43 is mounted upon the stationary bearing pedestals 12, and has movable therein a piston whose rod 44 extends outwardly from the cylinder to mount a pulley 45. A flexible drive connection is secured at one extremity to the cylinder 43, is trained over the piston pulley 45, and thence partially around a drive pulley 47 which is loosely mounted upon the stem 11 of the tank. The free end of the flexible drive 46 passes over the pulley 48 and supports a weight 49 upon its movable bight portion, being subsequently fastened in the manner indicated at 50 upon the frame 51 which supports the pulley 48 and an idler pulley 52. The main drive pulley 47 is mounted for oscillation upon the pedestal 12 and is formed upon its upper surface with a slant-face lug 53. This lug is adapted to engage with levers 54 which are carried upon the bottom of the tank at its central portion, being intermediately pivoted between ears 55 which depend from the tank bottom. These levers are so balanced and shaped that movement of the drive pulley 47 in the counter-clockwise direction of Fig. 4 engages through lug 53 an end of the adjacent lever and serves to drive the tank 10 in the same direction. Return movement of the pulley 47, however, in its clockwise direction, permits the levers 54 to slide over the slant face of the lug 53 without being engaged thereby for movement of the tank 10. While the pulley 47 is thus intermittently oscillatory, the imparted movement to the cooling tub is intermittently rotational only.

The fluid of pressure, which actuates the piston within the cylinder 43 to drive the operating pulley 45 outwardly, is conducted from any suitable source through the inlet feed pipe 56 and is controlled by a valve operating in the valve chamber 57 and having a stem 58 projecting therefrom. Upon the valve stem is eccentrically mounted a weight 59, while a lug 60 is supported upon a catch 61 to prevent any rotation of the valve stem due to the action of the weight 59. The catch 61 is controlled through the medium of an arm 62 pivoted to one of the guide plates 30 of the jack 28. Movement of the lifting piston 33 upwardly between its guide plates causes the arm 62, which projects into the path of the moving piston head, to release the catch 61 and thus permits the valve stem 58 to be rotated through the gravitational action of the eccentric weight. In this manner the valve interposed upon the feed pipe 29 is opened and the fluid of pressure admitted to the interior of the piston 43, causing a projection of the piston arm 44. A valve closure arm 63 is connected by a rigid link 64 to the extremity of the piston rod 44, so that when this piston reaches its limit of movement the arm 63 which is carried upon the valve stem 58 has rotated this stem to close the valve while at the same time lifting the weight 59 and the lug 60 to a position permitting a reëngagement with the catch 61. In the meantime, the piston head 33 which previously released the catch, has been retired to its lowermost limit of movement owing to the closing of its inlet valve 36 through the medium of the tank lug 41 which has, of course, been moved against the arm 39 during the first moments of rotation of the tank 10.

Operation of the cylinder 43 to drive the pulley 47 in the counter-clockwise direction which secures a partial rotation of the cooling tank, raises the movable bight of the flexible drive connection 46 whereby the return weight 49 is supported. Cessation of movement upon the part of the pulley 47, due to a closing of the cylinder valve through the operation of ring means 64, permits the weight 49 to return the oscillatable drive pulley, and consequently the operating piston arm 44 to their initial position, although this return movement of the driving mechanism for the tank has no effect upon the tank itself, as was previously explained.

In this manner, supposing that but three platform grids are employed within the tank, the latter is given a sufficient drive impulse to rotate it through one-third of a revolution. During this partial revolution the grid marked A in Figs. 1 and 3 is lifted from the terminus of the cam trackway 27 and placed upon the horizontal trackway 26, thus raising its core above the surface of the liquid within the tank 10, thoroughly cooled and in readiness to be removed. At the same time the following grid (marked B in Figs. 1 and 3) proceeds downwardly along the cam trackway and comes into position upon the piston head 33, which has meanwhile receded upon its cylinder, just as the partial revolution of the tank is completed, thus immersing the core with which this grid had been loaded into a cooling fluid. During this same partial revolution of the tank the third grid C, which was previously emptied by the core-men has moved around opposite the tire strippers and received the core which it is to later immerse upon the next partial revolution of the tank.

It will be seen from the foregoing that each third-way revolution of the cooling apparatus I propose herein moves one of the grids into position for removal of the cooled core it carries, moves the preceding empty grid into loading position, and plunges the third grid loaded with an uncooled core below the surface of the cooling liquid.

Every time that the machine comes to a stop, the core-man presses or kicks the valve arm 39 to admit the operating fluid into the jack 28. The following lug 41 closes off the jack valve as the tank begins its partial revolution, and after the rotary mechanism has been returned to its initial position by the described means 49, the process may be repeated. Suitable pockets 65 are secured to the side of the tank on the center line of each grid 13 to receive the bolts which the strippers remove from the core prior to peeling the tire therefrom.

It should be evident that my invention provides a core cooling apparatus which at no time requires an interruption of the laborers engaged in removing the tires from their cores; it also reduces the number of laborers in the tank emptying gang, since a single workman, continuously employed, can readily take care of removing all of the cores from the tank; while the actual labor of loading and unloading the cores into the tank is greatly facilitated by the particular mechanism disclosed.

What I claim is:

1. In a machine organized as described, a cooling tank; grids reciprocable within said tank; means for moving successive grids from the loading to the immersed position for articles to be cooled within the tank; means for moving the grids successively from the immersed to the unloading position; and means initiated by the last mentioned means for intermittently revolving said tank.

2. In a machine organized as described, a cooling tank; grids reciprocable within the tank; stems controlling reciprocation of the grids independently; and a trackway engageable by said stems for automatical immersion of the grids within the tank.

3. In a machine organized as described, a cooling tank; grids reciprocable within said tank; stems controlling the reciprocation of the grids independently; a trackway engageable by said stems and determining immersion of the grids within the tank; and means determining emersion of the grids from the tanks by disengagement of their stems, successively, from said trackway.

4. In a machine organized as described, a cooling tank; grids reciprocable within the tank; a trackway provided with a cam terminus; and stems controlling the reciprocation of the grids independently, said stems being engaged with said trackway and adapted to effect immersion of the grids, successively, upon reaching the cam terminus of said trackway.

5. In a machine organized as described, a cooling tank; grids reciprocable within the tank; a trackway provided with a cam terminus; stems controlling the reciprocation of the grids independently, said stems being engaged with said trackway and adapted to effect immersion of the grids, successively, upon reaching the cam terminus of said trackway; and means to secure the emersion of the grids, successively, by lifting them from said cam terminus to the beginning of said trackway.

6. In a machine organized as described, a cooling tank; grids reciprocable within the tank; a trackway provided with a cam terminus; stems controlling the reciprocation of the grids independently, said stems being engaged with said trackway and adapted to effect immersion of the grids, successively, upon reaching the cam terminus of said trackway; and drive means securing an intermittent rotation of said tank such that the tank comes to rest when a grid stem reaches the terminus of said trackway.

7. In a machine organized as described, a cooling tank; grids reciprocable within the tank; a trackway provided with a cam terminus; stems controlling the reciprocation of the grids independently, said stems being engaged with said trackway and adapted to effect immersion of the grids, successively, upon reaching the cam terminus of said trackway; means to secure emersion of the grids from the tank, by lifting them vertically from said cam terminus to the beginning of the trackway; and drive means providing an intermittent rotation for the tank, said drive means being initiated by the action of said lifting means.

8. In a machine organized as described, a revoluble cooling tank; grids mounted for reciprocation within said tank; a stationary trackway arranged below the tank and provided with a cam terminus; a pedestal for each grid engageable with said trackway and adapted to immerse the grid within the tank upon traveling over said cam terminus; means for returning the pedestal of each grid to the beginning of the trackway, to secure emersion of the grid from the tank; and means for intermittently rotating said tank to secure progression of said grid pedestals intermittently along said trackway.

9. In a machine organized as described, a cooling tank mounted for reciprocation; grids mounted within the tank; pedestals for each grid projecting from the tank; a trackway projected with a cam terminus engaging all of said pedestals simultaneously; oscillatable means arranged to impart an intermittent rotation to said tank; jack means for successively lifting the grid pedestals from the cam terminus to the beginning of the trackway; latch means normally preventing the operation of said oscillatable means; and means for releasing said latch means upon operation of said jack means.

10. In a machine organized as described, a revoluble cooling tank; grids reciprocable within the tank; manually operable means for controlling one phase of the reciprocation of each grid as the latter reaches a predetermined point in the revolution of said tank; drive means to impart an intermittent rotation to the tank; and means to return said drive means to its initial position upon the arrival of one of the grids at the said predetermined point in the revolution of the tank.

In testimony whereof I have signed my name in the presence of two subscribing witnesses.

EDWARD NALL.

Witnesses:
　ANNA B. NALL,
　H. J. GINTHER.

Copies of this patent may be obtained for five cents each, by addressing the "Commissioner of Patents, Washington, D. C."